United States Patent
Donoghue et al.

[11] 3,844,870
[45] Oct. 29, 1974

[54] PROCESS CONTROL SYSTEM

[75] Inventors: John Francis Donoghue; Dan Edward Forney; Robert Lee Heiks, all of Columbus; Gerald A. Lasson, Dublin; Robert Eugene Mc Call, Columbus; Charles Ray Rich, Powell, all of Ohio

[73] Assignee: Industrial Nucleonics Corporation, Columbus, Ohio

[22] Filed: June 12, 1972

[21] Appl. No.: 261,999

[52] U.S. Cl.............. 156/360, 156/110, 156/244, 156/394, 118/8, 235/151.3, 235/151.13, 250/360, 425/141
[51] Int. Cl............................................ B32b 31/06
[58] Field of Search......... 156/360, 244; 235/151.3, 235/151.13; 118/8; 425/141; 250/360

[56] References Cited
UNITED STATES PATENTS

| | | | |
|---|---|---|---|
| 2,750,986 | 6/1956 | Russell et al..................... | 156/360 X |
| 3,006,225 | 10/1961 | Mamas............................... | 80/56 |
| 3,067,939 | 12/1962 | Ziffer................................ | 235/151.3 |
| 3,190,261 | 6/1965 | Ziffer................................ | 250/360 |
| 3,292,208 | 12/1966 | Wood................................ | 425/141 |
| 3,307,215 | 3/1967 | Gerhard et al..................... | 425/141 |
| 3,378,676 | 4/1968 | Clement............................ | 235/151.3 |
| 3,405,267 | 10/1968 | Chope................................ | 250/308 |
| 3,510,374 | 5/1970 | Walker.............................. | 425/141 |
| 3,515,860 | 6/1970 | Fitzgerald........................ | 235/151.13 |
| 3,531,827 | 10/1970 | Dragonette........................ | 425/141 |
| 3,562,500 | 2/1968 | Grant................................ | 235/151.3 |
| 3,566,092 | 2/1971 | Grant................................ | 235/151.3 |
| 3,599,288 | 8/1971 | Eakman............................. | 425/141 |
| 3,609,318 | 9/1971 | Anderson........................... | 235/151.3 |
| 3,610,897 | 10/1971 | Gerhard............................. | 235/151.3 |
| 3,635,627 | 1/1972 | Palmer.............................. | 425/141 |

Primary Examiner—Clifton B. Cosby
Attorney, Agent, or Firm—William T. Fryer, III; Allan M. Lowe; Walter R. Nielson

[57] ABSTRACT

A process monitoring and control system is provided for use in a tire calendering system producing a strip of rubber tire material comprising a layer of tire cord laminated between first and second layers of rubber. In a preferred embodiment, thickness and profile information relating to the first rubber layer is provided by a pair of single point radiation backscatter gauges located prior to the point of lamination of the first layer with the tire cord and the second layer. Thickness and profile information relating to the combined strip is provided at the calender output by a scanning total thickness gauge. Any deviation of the thickness information related to the first layer and the combined strip from desired thickness targets is used as the basis of uniform machine direction control over the first layer and the second layer to maintain the total thickness at the desired target. Any deviation of the profile information related to the first layer and the combined strip from a desired profile is used as the basis of cross direction control over the first and second layers to maintain the profile of the combined strip at the desired profile. Computer means for estimating the profile of the first layer based on a curve fit to discrete thickness indications supplied by the pair of fixed gauges is provided.

37 Claims, 3 Drawing Figures

PROCESS CONTROL SYSTEM

The present invention relates generally to a tire calendering system for the production of rubber tire material comprising a layer of tire cord laminated between two layers of rubber, and more particularly, to a method or apparatus for controlling a tire calendering system which includes means for measuring the total thickness of the rubber tire material produced at the tire calender as well as the thickness of a component layer thereof, and controlling means for regulating adjustable machine direction and cross direction calender control elements to maintain the rubber tire material at a desired total thickness, profile, and cross-section with respect to the position of the tire cord.

CROSS REFERENCE TO RELATED APPLICATIONS

The present invention relates to the inventions disclosed in the copending applications entitled "Process Control" of R. Heiks, et al. Ser. No. 262,000, filed June 12, 1972, "Process Control" of J. Donoghue et al. Ser. No. 261,997, filed June 12, 1972, and "Measuring Gauge" of John Donoghue, Ser. No. 261,998, filed June 12, 1972 all assigned to the assignee of the present invention and filed on even date herewith.

BACKGROUND

In the rubber tire calendering art, control of the manufactured sheet of tire material within precise limits is of highly significant concern. The production of rubber-coated cord within close tolerance is critical both from the standpoint of the quality of the manufactured article-optimum tire appearance, controllability, safety, and longevity — and from the standpoint of reducing the costs associated with production — minimized use of raw materials, minimized production of off-spec material, and minimized unproductive machine and manpower time. A further significant result of more accurate production control is the potential for a higher production rate brought about by a heightened confidence in the ability of the system to meet target specifications.

In the usual tire calendering process, a tire cord, comprising a layer of textile, metallic, or synthetic material, is forcibly laminated between two layers of rubber by means of opposing calender rolls. These layers are usually of equal thickness, though, of course, this need not be the rule. The positioning of the tire cord within the rubber tire material laminate must be precisely controlled within close tolerances, for the reasons given above relating to tire quality and production economics. Assurance that such positioning is in fact attained is had by maintaining a relatively constant thickness in the rubber layers above and below the tire cord.

In addition to the exact positioning of the cord within the rubber layers, it is also highly important that the total thickness of the calendered tire material be maintained as close as possible to a selected total thickness target. This is necessary from the point of view of the tire building process, for which the tire material is preferably at a constant total thickness, as well as the ultimate quality of the finished tire, in that a tire having insufficient rubber will not wear properly whereas one having an excess of rubber will be subject to excessive heat build-up from internal friction forces.

It is further of importance that the profile of the calendered tire material be maintained substantially constant across its width. The production of rubber tire material having a uniform profile is necessary for the achievement of quality standards with respect to the finished tire, as well as for the minimization of production costs In referring to the amount of rubber deposited on either side of the tire cord, the terms "thickness" and "weight" are used interchangeably in the rubber art, since if the density of the rubber material is known, its thickness can readily be calculated from a measurement of its weight per unit area. To simplify the presentation which follows, the term "thickness" will be used exclusively, with the express reservation that alternative forms of measurement are not thereby relinquished.

It is well known in the calendering art to monitor the total thickness of the calendered sheet of material leaving the calender rolls and to apply corrective feedback control, if necessary, to the calender rolls by actuating adjustable calender control elements. One known form of calender control employs a scanning radiation thickness gauge to measure the final thickness of the material, and compares such thickness with a target for the purpose of controlling adjustable screwdown and profile-controlling elements, such as cross-axis elements or roll-bending elements, located at the calender, thereby bringing the thickness of the material sheet to the target. U.S. Pat. No. 3,006,225, issued Oct. 31, 1961 to L. G. Mamas, assigned to the same assignee as the present application, and U.S. Pat. No. 3,599,288, issued Aug. 17, 1971, to S. L. Eakman, disclose calendering systems of this form.

U.S. Pat. No. 3,610,897, issued Oct. 5, 1971 to George R. Gerhard et al., assigned to the assignee of the present application, discloses, in one embodiment, a tire calendering control system, in which variations in cross direction profile are measured using a scanning gauge and several single point gauges located at the calender output, which variations are used to offset zonal targets each corresponding to the desired total thickness of one of a plurality of zones across the sheet. Control adjustments are made equally to the top and bottom rubber layers in order to maintain the total thickness on target.

While calender control systems of this type have certain advantages — namely, the ability to control profile as well as thickness — they lack the ability to control the relative spacing of different layers of material within a composite material sheet.

Several attempts have been made to provide rubber calendering control systems for accurately and consistently positioning the tire cord with respect to the underlying and overlying rubber layers. For example, one known device, described in U.S. Pat. No. 2,750,986, issued June 19, 1956 to R. W. Russell et al., uses four beta-ray transmission gauges, two of which measure bottom thickness, the other two total thickness, in a two-stand rubber calendering system. The bottom thickness gauges form part of a control loop controlling bottom thickness by means of adjustments to the bottom layer calendering rolls; similarly, the total thickness gauges form part of a control loop for adjusting the calendering rolls associated with the top layer. The two gauges associated with each pair of calender rolls adjust the calender roll spacing according to whether the measured thickness is below or above specifications. A deficiency inherent in this system is that the gauges which measure and control thickness are all single point gauges. That is, they measure thickness from fixed positions which ignore any variations in the cross direction (edge-to-edge) profile of the material. Further, these gauges are also located relatively distant from the calender rolls, necessitating a relatively lengthy transport delay between successive control actions.

Another known tire calendering control system utilizes single point gauges adjacent one of the bottom pair of calender rolls in a Z-calender to measure bottom thickness and control the same to a bottom thickness target by means of a bottom thickness control loop, including adjustable screwdown between the bottom rolls. In addition, a scanning total thickness gauge at the calender output controls total thickness to a total thickness target by controlling the thickness of the top layer independently of the bottom thickness control. This calender control system, although not subject to transport delay problems with respect to bottom thickness control, tends to over and under-correct for bottom thickness errors, since both control loops may react in response to a bottom thickness error.

A further known calender control system, used in conjunction with a common Z-type calender, utilizes three single point thickness gauges located at different transverse positions on one of each of the top and bottom pairs of rolls for measuring top and bottom layer thickness in each of three longitudinal zones of the sheet, and a scanning beta-ray transmission gauge downstream of the calender for measuring total thickness. The single point gauges compare the measured top and bottom zonal thicknesses with corresponding zonal target thicknesses in order to independently control the thicknesses of the top and bottom layers by zones. The scanning gauge measures deviations of total thickness from a total thickness target and offsets the targets associated with the single point gauges in the directions necessary to regain compliance with the total thickness target. While this calender control system is not subject to the objections of the aforementioned system, it requires a multiplicity of single point gauges, with their concomitant problems of maintenance and cost. Moreover, it requires a total of seven separate gauging subsystems for the thickness and profile control of the top layer, bottom layer, and total laminate, respectively.

The present invention offers a unique and precise solution to the tire calendering problem of maintaining a desired total thickness profile, and tire cord position relative to the top and bottom layers of rubber, as will be apparent from a reading of the description which follows.

SUMMARY OF THE INVENTION

We provide a tire calender monitor and control apparatus which gives a precise control of the tire calendering process to conform the profiles of the top and bottom layers to desired profiles, whereby the profile of the combined material strip is maintained at a desired profile.

According to one specific embodiment, in which a standard four-roll rubber calender is employed, two single point thickness gauges are positioned adjacent one of the bottom pair of calender rolls to provide indications of the thickness of the bottom rubber layer as it passes over the roll prior to the point of lamination with the cord and top rubber layer. One gauge is located near one end of the calender roll, while the other gauge is movable between the opposite end and the center of the roll. A scanning thickness gauge is positioned downstream from the calender to provide an indication of the total thickness of the combined layers. The indications of thickness are smoothed over time by an averaging means.

A control system is provided to automatically correct machine direction variations in the top and bottom rubber layers independently. The function of the machine direction controllers associated with the top and bottom pairs of calender rolls is to maintain the top and bottom rubber layers, and thereby the entire sheet, at predetermined thicknesses, and furthermore to maintain the tire cord at a predetermined spacing between the top and bottom rubber layers. With respect to the bottom layer, adjustable screwdown elements located at either end of one of the bottom pair of rolls are controlled in response to the deviation of the average bottom thickness, obtained by averaging the separate indications obtained at each of the three single point locations adjacent the bottom rubber layer, from a bottom thickness target. With respect to top layer thickness control, a top thickness deviation is derived by subtracting the bottom thickness deviation from the deviation of average total thickness from a total thickness target. Coordinated measurements of bottom thickness and total thickness are made over the same longitudinal region of the material strip, essentially in the manner described in the aforementioned related application "Process Control" of J. Donoghue et al. The top thickness deviation is used as the basis for the control of screwdown elements at either end of one of the top calender rolls. Both the top and the bottom pairs of screwdown elements are controlled in such a manner that the adjustment which are made to opposite ends of the rolls are equal.

Additional control is provided to automatically correct cross direction variations in the top and bottom rubber layers independently. The purpose of cross direction control is to conform the strip to a desired cross direction profile, such as, for example, a flat profile. This form of control is achieved by actuating adjustable profile control means, such as cross-axis or roll-bending elements, associated with each pair of calender rolls, in addition to simultaneously actuating the aforementioned screwdown elements.

The control of cross direction profile is the same, in a general sense, for the top and bottom layers. The main difference lies in the manner in which the top layer and bottom layer thickness profiles are determined. The bottom layer thickness profile is provided by means of a curve-fitting operation between the separate bottom thickness indications obtained from the three single point gauges, essentially in the manner described in the aforementioned application "Measuring Gauge" of J. Donoghue. The sheet of calendered rubber material is subdivided for the purpose of profile control into three longitudinal zones, which may be of equal width. The bottom thickness profile calculated by means of the curve-fitting operation is evaluated over each of these three zones to provide individual averages of bottom thickness by zone. These zonal averages are individually compared to a total average of bottom thickness to provide individual zonal deviations from the total average. The zonal deviations are read into a bottom cross direction controller which accordingly adjusts the profile control elements associated with the bottom layer to bring the bottom layer to the uniform, desired cross direction profile.

Upper layer profile control is performed based on upper layer zonal deviations, which are derived as a function of the difference between total thickness deviations and the bottom thickness deviations. Total thickness deviations by zone are derived by subdividing the total thickness profile provided by the scanning gauge into three zones coinciding with the three zones of the bottom layer, deriving individual averages of total thickness for each zone, and comparing the same with an overall average of total thickness. The previously derived bottom thickness zonal deviations are subtracted from the total thickness deviations, zone by zone, to provide zonal deviations for the top layer. These are read into a top profile controller, which adjusts the profile control elements associated with the top layer to bring the top layer to the desired, usually uniform cross direction profile.

Applicants' method and apparatus for controlling a tire calender system is unique in that it separately controls the thicknesses of the bottom layer and of the combined sheet of material to selected target thickness, while independently controlling the profiles of the bottom layer and combined sheet of material to respective average values of thickness.

Applicants' unique gauging and control configuration, including single point gauges measuring the thickness of the bottom layer prior to lamination with the top layer and tire cord layer, permits the thickness of the bottom layer to be controlled nearly instantaneously to the bottom thickness target, since there is practically no transport delay between the location at which corrective control action is applied with respect to bottom thickness and the location of a single point bottom thickness gauge. In addition, a unique measuring system, including computer means for deriving an estimated bottom layer profile on the basis of the individual measurements given by the single point gauges, is provided.

Moreover, the invention embodies the highly desirable feature of locating at least one gauge, here a scanning gauge, downstream from the laminating rolls. Thereby, the final combined thickness of the top layer, tire cord, and bottom layer, which heretofore in the process cannot be reliably determined because of the unpredictable effect of the laminating rolls and because of variations in the tire cord thickness, may be measured with the confidence that it has reached substantially its final value.

Applicants' method and apparatus for controlling a tire calender system, in contrast to prior art tire calender control systems, has the advantage of requiring only three gauges to maintain the bottom and total thicknesses at selected thickness targets, to maintain a desired position of the cord within the calendered material, thus eliminating a substantial source of hardware and maintenance costs. Importantly, bottom thickness control is not subject to double correction, as in certain of the aforementioned systems, since the bottom thickness and total thickness control loops are interconnected so as to eliminate bottom error as a factor affecting total thickness control.

Because measurements of bottom and total thickness are derived, for the purposes of total thickness control and bottom and total profile control, from substantially the same longitudinal region of the material strip, machine direction variations in thickness are essentially eliminated as a source of error in the control signal computations.

The present invention offers a unique and precise solution to the tire calendering problem of maintaining a desired total thickness profile, and tire cord position relative to the top and bottom layers of rubber, as will be apparent from a reading of the description which follows.

OBJECTS OF THE INVENTION

Accordingly, it is an object of the present invention to provide an improved tire calender control system, which maintains the calendered material at a desired total thickness, profile, and cross-section with respect to the tire cord.

It is another object of the present invention to provide an improved tire calender control system in which the functions of thickness control and profile control are performed independently.

It is yet another object of the present invention to provide an improved tire calendering control system, in which an accurate thickness profile of the bottom layer is obtained by fitting a curve between separately measured indications of bottom thickness, which thickness profile may be used as a basis for the control of profile.

It is a further object of the present invention to provide an improved tire calender control system, in which machine direction variations in thickness are controlled at more frequent intervals than variations in profile.

It is still a further object of the present invention to provide an improved tire calender control system, in which an indication of top thickness error is obtained by subtracting an indication of bottom thickness error from an indication of total thickness error, which indication of top thickness error is used for control purposes.

It is another object of the present invention to provide an improved tire calender control system, in which measurements of bottom and total thickness are derived from substantially the same longitudinal region of the calendered material by coordinating the measuring actions of the gauges providing such measurements.

It is still another object of the present invention to provide an improved tire calender control system which carries out the aforementioned objects utilizing a minimum number of measuring gauges.

Further objects and advantages will become apparent from the following detailed description of the preferred apparatus according to the invention, taken in conjunction with the appended drawings.

TIRE CALENDERING PROCESS

Figure 1A:
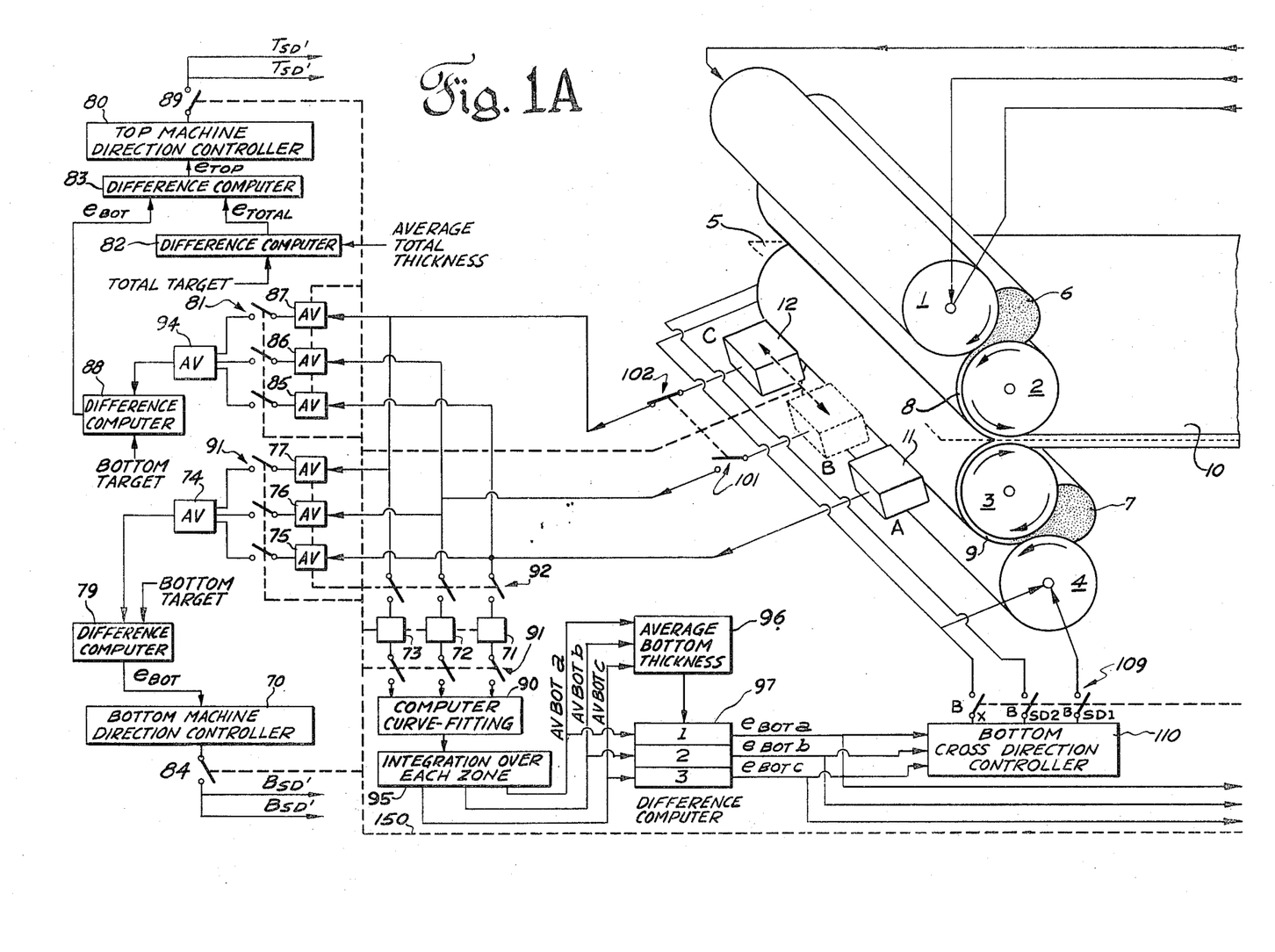
FIG. 1 is a partially perspective and a partially schematic view of a tire calender process, in combination with an improved tire calender control system according to the invention.
Figure 1B:
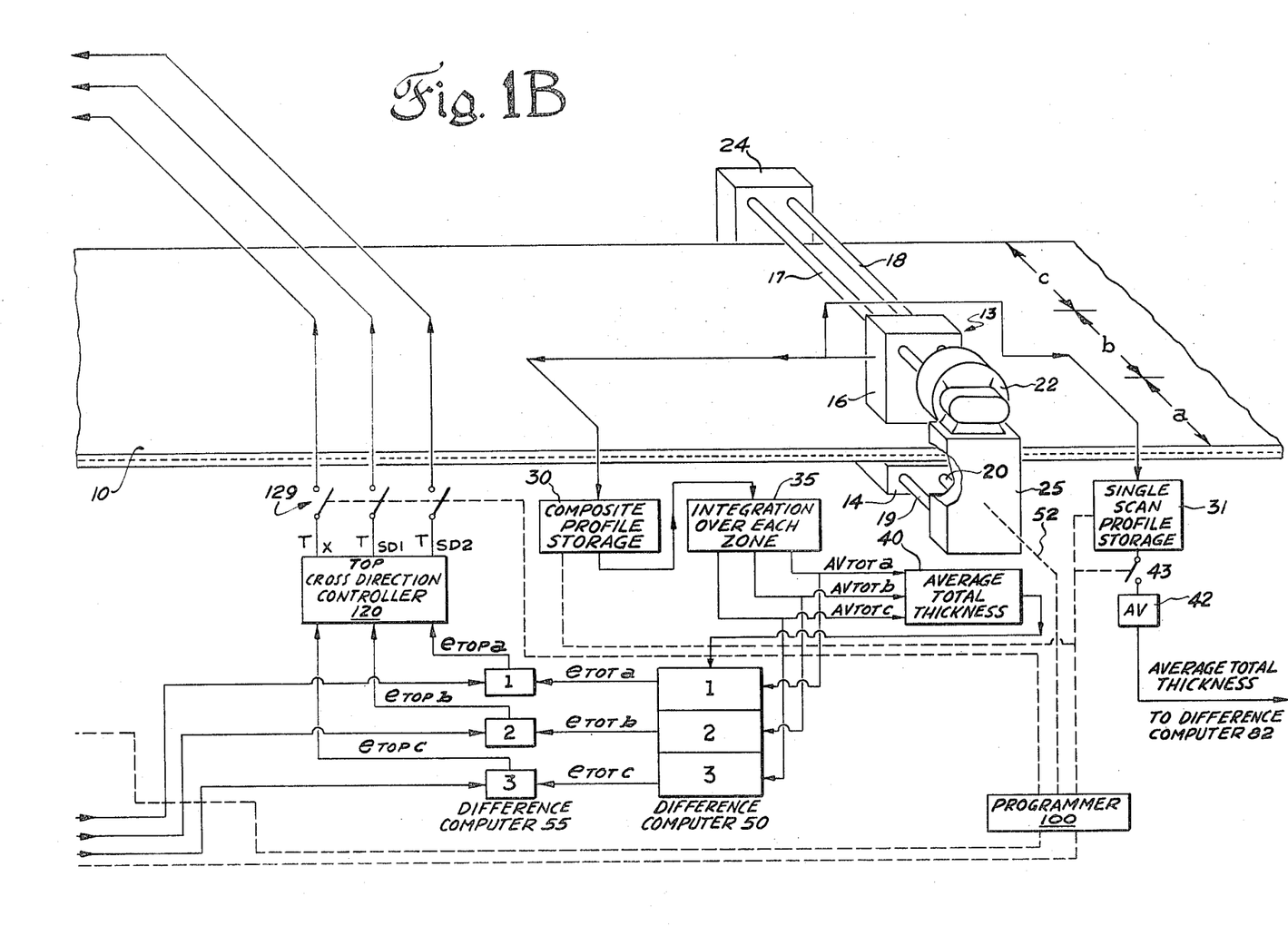

With reference now to FIG. 1, a typical four-roll tire calender includes a top pair of coacting calender rolls 1 and 2, supporting a bank 6 of rubber at the input side thereof, and forming a top layer of rubber 8 in substantially continuous fashion at their output side. A corresponding pair of bottom calender rolls 3 and 4 support a bank 7 of rubber at the input side thereof and form a bottom layer of rubber 9 at their output side. The top layer 8 and bottom layer 9, together with the tire cord layer 5, form a composite sheet of tire material 10 as they pass through laminating rolls 2 and 3. Adjustable thickness control elements (not shown), such as screw-down or hydraulic elements, at either end of the top and bottom pairs of calender rolls may be actuated to vary the roll pair spacings to increase or decrease the thickness of top layer 8 and bottom layer 9. In addition, adjustable profile control elements (not shown), such as cross-axis or roll-bending elements, at either end of the top and bottom pairs of rolls may be actuated to vary the spacing between the center of each pair of rolls with respect to the spacing at their ends to alter the profiles of the top layer 8 and bottom layer 9. In preferred embodiment, cross-axis elements are used for the purpose of profile control.

THICKNESS GAUGES

Two single point radiation backscatter gauges 11 and 12 are positioned adjacent one of the laminating rolls 2 or 3 to measure the thickness of the rubber layer passing over it prior to lamination. In a preferred embodiment, these gauges are positioned adjacent the lower of the two laminating rolls, roll 3, to measure the instantaneous thickness of the bottom rubber layer 9. Gauge 11 is fixed at a position A at one end of laminating roll 3, whereas gauge 12 is movable between the positions B and C, situated in the center and at the end, respectively, of laminating roll 3 for purposes to be described below. Alternatively, two separate gauges may be employed in place of the translatable gauge 12. Single point gauges 11 and 12 need not be limited to the radiation backscatter type, as they may be of any type suitable for measuring the thickness of a layer of material moving over a roll.

A scanning radiation transmission gauge 13, consisting of a radiation source 16 mounted for traversing movements on the pair of upper guide rails 17 and 18, and a radiation detection unit 14, mounted for traversing movements on the pair of lower guide rails 19 and 20, is located at the output side of laminating rolls 2 and 3. The source and detector units 16 and 14, respectively, are traversed by means of a motor 22 powering a drive chain (not shown) attached to the source and the detector units 16 and 14 and extending between transmission gauge supports 24 and 25 situated on either side of the rubber material strip 10. Telescoping, U-shaped, or other types of traversing mounts may alternatively be used. Scanning gauge 13 need not scan the entire width of the rubber strip 10, but in the preferred embodiment, in order to measure a sufficiently representative portion of the strip 10, it is in fact programmed to scan substantially the entire width of the sheet 10.

During the course of a single scan across strip 10 by scanning gauge 13, the instantaneous measurements of total thickness provided by gauge 13 are averaged over the lengths of each of a plurality of increments along the path measured, and the respective indication of average total thickness corresponding to each increment is stored in a discrete location in single scan profile storage means 31, for a purpose to be explained below.

Over a predetermined number of scans across strip 10 by scanning gauge 13, the instantaneous measurements of total thickness provided by scanning gauge 13 are averaged over the lengths of each of a plurality of increments along the path measured, and the respective indications of average total thickness corresponding to each increment are successively stored in a discrete location of composite profile storage means 30, where successive indications of average total thickness obtained for the particular increment are accumulated. Reference may be had to U.S. Pat. No. 3,552,203, issued Jan. 5, 1971 to E. J. Freeh, and assigned to the assignee of the present application, for details concerning incremental averaging over a series of scans by a scanning gauge. The incremental averages of total thickness stored in composite profile storage means 30 represent primarily the cross direction components of the total thickness profile scans made by scanning gauge 13, which are obliquely shaped due to the motion of the material strip 10 with respect to the traversing motion of scanning gauge 13 (see FIG. 2). The number of increments chosen should be sufficient to allow a representative profile of the sheet with respect to total thickness. For example, for a sheet width of 60 inches, 20 three-inch segments may be suitable.

MACHINE DIRECTION CONTROL

The primary object of machine direction control is to maintain the top and bottom layers of rubber at selected target thicknesses. Machine direction component variations in thickness may arise on account of variations in the density and composition of the rubber stock, temperature changes, speed changes, and other factors which are assumed to affect the thickness of the material equally across its width while varying along its length.

By controlling machine direction variations at frequent intervals, independently of the control over cross direction variations, a high quality of calendered tire material is assured, because the thickness of the layers of rubber overlying and underlying the tire cord is more likely to be maintained essentially constant and on target.

BOTTOM MACHINE DIRECTION CONTROL

The control of machine direction variations in the thickness of bottom layer 9 is accomplished by means of bottom machine direction controller 70, which receives as an input an indication of bottom thickness error $e_{bot.}$ and reads out correction signals to screw-down elements (not shown) at each end of calender roll 4. The bottom thickness error $e_{bot.}$ is calculated by comparing an indication of average bottom thickness with a selected bottom thickness target.

To obtain the indication of average bottom thickness, the measurements of bottom thickness obtained at each of the three points A, B, and C adjacent roll 3 are separately averaged and stored in averaging means 75, 76 and 77, associated with measured points A, B, and C, respectively. Averaging means 75 averages and stores the instantaneous thickness measurements of gauge 11. Averaging means 76 averages and stores the instantaneous thickness measurements from gauge 12 when it is in position B, at which position programmer 100 closes switch 101 to averaging means 76 and opens switch 102 to averaging means 77. (The controlling functions performed by programmer 100 with respect to the various switches and averaging means shown in FIG. 1 are indicated, in certain cases, as being made over a single bus line 150, for the sake of simplicity, though in actuality bus line 150 comprises a plurality of parallel control buses.) When gauge 12 is in position C, programmer 100 reverses the positions of switches 101 and 102, thereby connecting gauge 12 with averaging means 77. To read the averages of bottom thickness from averaging means 75, 76 and 77, into averaging means 74, which provides an indication of overall average bottom thickness, programmer 100 closes switch 91 for a predetermined time interval prior to each control action. Averaging means 75, 76 and 77 are reset by programmer 100 at the initiation of each bottom thickness control action.

When gauge 12 is located at position B at the center of calender roll 3, the indication of bottom thickness at position C may be estimated, if desired, in order to provide a continuous average indication of bottom thickness at point C. The estimation of the indication at point C may be made, for example, by observing the long term variation between the bottom thickness measurement obtained from gauge 11 and that obtained from gauge 11 and that obtained from gauge 12 when it is situated at point C, determining an average correction value based on the deviation, and applying the correction value to the indication of bottom thickness provided by gauge 11.

Difference computer 79 subtracts the indication of overall average bottom thickness provided by averaging means 74 from the selected bottom thickness target to provide an indication of bottom thickness error $e_{BOT.}$ from difference computer 79 and computes the necessary screwdown correction $B_{SD'}$ to be made to each end of calender roll 4. The same correction $B_{SD'}$ is applied to the screwdown element at each end of roll 4 upon the closing of switching means 84 by programmer 100.

The time period between successive bottom machine direction control actions is equal to an adjustable predetermined time period plus the time required to compute and apply the bottom screwdown corrections. Importantly, bottom thickness is capable of being controlled rapidly to the bottom thickness target, because there is only a small transport delay between the location at which corrective control action is applied and the location of the single point bottom thickness gauges.

TOP MACHINE DIRECTION CONTROL

The control of machine direction variations in the thickness of top layer 8 is accomplished by means of top machine direction controller 80, which outputs correction signals to screwdown elements (not shown) at each end of calender roll 1 in response to an indication of top thickness error $e_{TOP}$, based upon the difference between the total thickness error $e_{TOTAL}$ (total thickness target minus total thickness measurement) and the bottom thickness error $e_{BOT.}$ (bottom thickness target minus bottom thickness measurement).

The total thickness error $e_{TOTAL}$ and bottom thickness error $e_{BOT.}$ are derived from coordinated measurements of bottom thickness and total thickness over the same longitudinal region of the material strip, in the manner disclosed in the aforementioned copending application entitled "Process Control" of J. Donoghue et al., filed herewith. To this end programmer 100 includes a timing means coordinating a bottom thickness sampling action by averaging means 85, 86 and 87 with the scanning action of gauge 13. The initiation of bottom thickness sampling action by averaging means 85, 86 and 87 is coordinated with the initiation of a total thickness scan by gauge 12, over control lines 150 and 52 respectively, such that gauge 13 begins traversing strip 10 and providing indications of total thickness to single scan profile storage means 31 after a time subsequent to the initiation of said sampling action equal to the transport delay between the machine direction locations of the single point gauges 11 and 12 and the scanning gauge 13. (Refer to FIG. 2.) The termination of the sampling action by averaging means 85, 86 and 87 occurs at a time prior to the completion of the scan by gauge 13, to scan the same region along the sheet length.

To read out the coordinated measurements of bottom and total thickness residing in averaging means 85, 86 and 87 and in single scan profile storage means 31, respectively, programmer 100 closes switch 81 to read the average indications of bottom thickness stored in averaging means 85, 86 and 87 into bottom thickness averaging means 94, and closes switch 43 to read the incremental averages of total thickness stored in single scan profile storage means into total thickness averaging means 42. It will be understood that neither of averaging means 86 and 87 will contribute an indication to averaging means 94 when gauge 12 is connected to the other of the averaging means 86 and 87. Single scan storage means is reset by programmer 100 prior to the next coordinated measuring sequence.

The indication of average total thickness over the coordinated single scan measurement period provided by averaging means 42 is subtracted from a selected total thickness target by means of difference computer 82 to provide an indication of total thickness error $e_{TOTAL}$. The indication of average bottom thickness over the coordinated single scan measurement period provided by averaging means 94 is subtracted from a selected bottom thickness target in difference computer 88 to provide an indication of bottom thickness error $e_{BOT.}$. The indication of bottom thickness error $e_{BOT.}$ is subtracted from the total thickness error $e_{TOTAL}$ to give a top thickness error $e_{TOP}$ by means of a difference computer 83.

The top thickness error $e_{TOP}$ is read into top machine direction controller 80, which outputs an equal screwdown correction $T_{SD'}$ to the screwdown elements at either end of calender roll 1, upon the closing of switch 89 by programmer 100.

The period between successive top layer machine direction control actions is equal to the time required for one scan by gauge 13, plus the time required to compute and output the screwdown corrections to calender roll 1, plus the transport delay of the process. If desired, the indication of average total thickness may be derived from other than one scan by scanning gauge 13.

The total thickness target is set according to the desired total thickness of the laminated tire material, consisting of the tire cord and upper and lower rubber layers. The actual value used in the calender control system will be dependent upon the composition of the tire cord and rubber, the geometry of the gauge setup, the type of radiation, and other factors affecting transmissivity.

CROSS DIRECTION CONTROL

The primary object of cross direction control is to correct for deviations of the top and bottom layers from desired profiles, for example, flat profiles. Typical departures from a flat profile, such as crown (raised center portion), dish (lowered center portion), or skew (slanting from edge to edge), are corrected by adjusting combinations of the screwdown and cross axis elements associated with each of rolls 1 and 4, effecting profile changes in the top and bottom layers, respectively.

Figure 2:
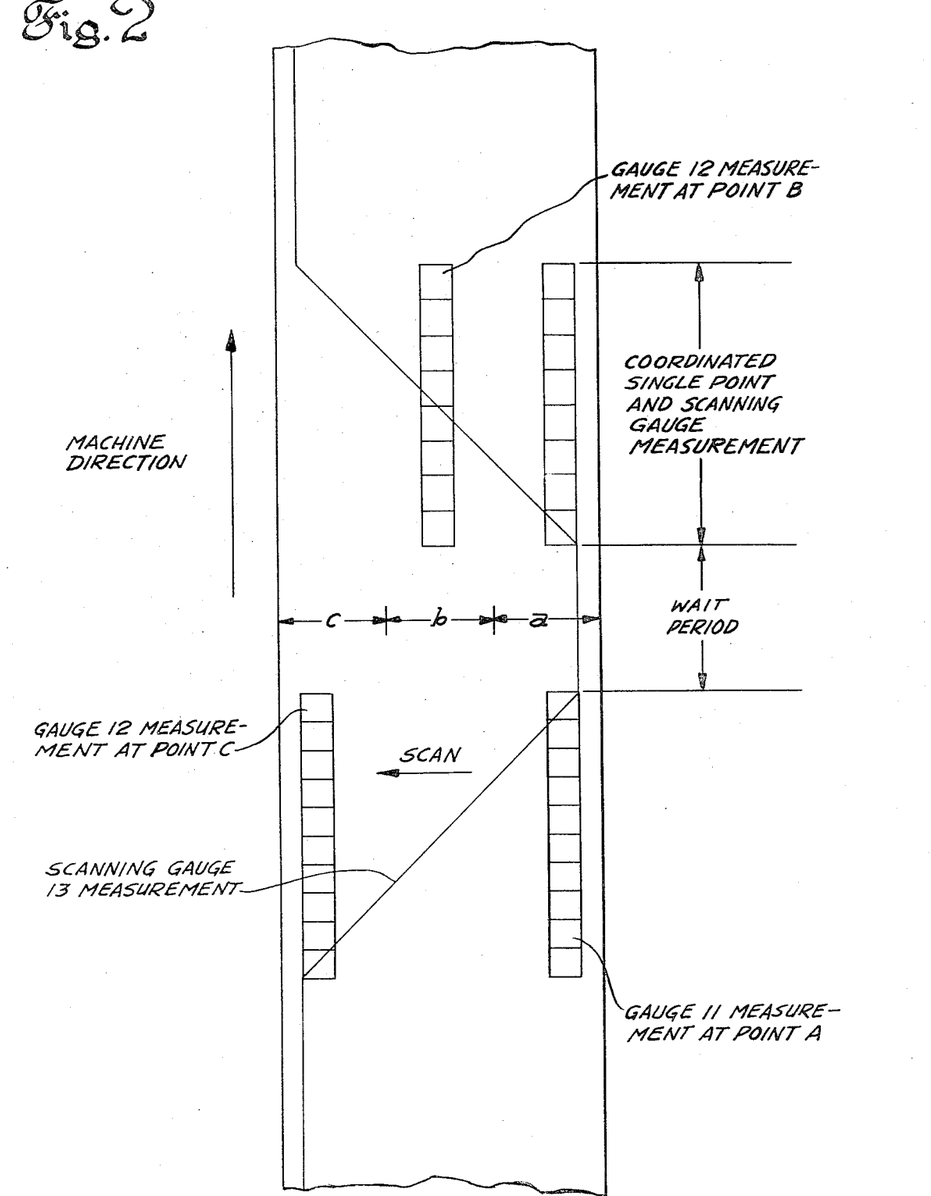
FIG. 2 is a diagram representing the coordinated measurements by the two single point gauges and the scanning gauge of bottom and total thickness, respectively, over the same longitudinal region of the moving rubber strip.

To localize and control cross direction deviations from an essentially flat profile, the material strip 10 is subdivided into a plurality of longitudinal, non-overlapping zones. In a preferred embodiment, the strip 10 is subdivided into three equal zones $a$, $b$, and $c$ as shown in FIG. 2. Each of the single point measuring positions associated with backscatter gauges 11 and 12 lies within a respective one of said zones $a$, $b$, and $c$. The objective of cross direction profile control whether from the point of view of the bottom layer, top layer, or total sheet, is to conform the average thickness of each of the zones $a$, $b$, and $c$ to the overall average thickness across the strip 10. In a unique manner, zonal deviations from the overall average are obtained to differentiate top and bottom cross direction profile control. U.S. Pat. No. 3,307,215 issued Mar. 7, 1967 to G. R. Gerhard et al., assigned to the assignee of the present application discloses an embodiment in which a material property in each of several zones is controlled to an average value of property across the strip. The sheet average is controlled to target by a uniform adjustment, across the machine direction by a separate sheet control mechanism.

BOTTOM CROSS DIRECTION CONTROL

Zonal deviations from the average layer thickness are obtained through the technique of estimating cross direction profile described in the aforementioned application entitled "Measuring Gauge" by J. Donoghue, in the following manner. A regression equation is calculated to describe the approximate mathematical relationship between measured bottom thickness and the three cross direct gauge positions A, B, and C on bottom layer 9, by means of computer curve fitting means 90. The regression equation is integrated over limits representing the edges of the individual zones by integration means 95 to obtain separate indications of average bottom thickness, AV.BOT.$a$, AV.BOT.$b$, and AV.BOT.$c$, corresponding to each of zones $a$, $b$, and $c$. These are averaged together in averaging means 96 resulting in an indication of average bottom thickness from which the individual zonal averages of bottom thickness are subtracted by means of difference computer 96 to yield individual zonal deviations from average bottom thickness, $e_{BOT.a}$, $e_{BOT.b}$, and $e_{BOT.c}$, respectively.

These zonal deviations are then read into bottom cross direction controller 110, which may be of the type described in U.S. Pat. No. 3,599,288, issued Aug. 17, 1971 to Stephen L. Eakman, wherein the necessary screwdown corrections $B_{SD_1}$ and $B_{SD_2}$ and the cross axis correction $B_X$ are calculated taking into account the interactive relationship between screwdown and cross-axis elements.

The screwdown corrections $B_{SD_1}$ and $B_{SD_2}$ and the cross-axis correction $B_X$ are output to the screwdown and cross-axis elements associated with roll 4, upon the closing of switch 109 by programmer 100.

To provide computer curve-fitting means 90 with indications of bottom thickness with which to estimate the bottom layer profile, averaging means 71, 72 and 73 sample the indications of instantaneous bottom thickness provided by gauges 11 and 12 over a coordinated measuring sequence comprising several traversals by gauge 13 of sheet 10. In a preferred embodiment, the sampling of bottom thickness for profile control purposes is undertaken over a sequence of eight scans. During the last two scans gauge 12 is moved to position B. The sampling by averaging means 71, 72 and 73 is coordinated with the scan sampling by composite profile storage means 30 in a manner similar to that described above with respect to the coordinated measurements of bottom and total thickness for top machine direction control. To this end, programmer 100 includes a timing means to coordinate the operation of sampling switch 92 with the traversals by gauge 13 to cause averaging means 71, 72 and 73 to sample bottom thickness over the same longitudinal portion of strip 10 that is measured by gauge 13 with regard to total thickness.

At the conclusion of the last scan in the coordinated measuring sequence connected with profile control, the separate indications of average bottom thickness at each of points A, B and C are read into computer curve-fitting means 90 upon the closing of switch 91 by programmer 100.

The number of scans upon which profile control is based may be variable, if desired, so that profile may be undertaken after a lesser number of scans, as, for example, after the initiation of a product change.

TOP CROSS DIRECTION CONTROL

Top cross direction control is accomplishsed by the screwdown and cross-axis elements associated with top roll 1, acting in response to top layer zonal deviations, which are calculated by subtracting the bottom zonal deviations from corresponding total zonal deviations, which are obtained in the following manner. Zonal indications of average total thickness are obtained by reading the total thickness profile stored in composite profile storage means 30 in the form of accrued incremental averages of total thickness into integrating means 35 upon the conclusion of the last scan in the coordinated measuring sequence connected with profile control. Integrating means 35 averages the total thickness profile between limits representing the edges of zones $a$, $b$ and $c$. The resulting zonal indications of average total thickness AV.TOT $a$, AV.TOT $b$, and AV.TOT $c$ are averaged together in averaging means 40, and individually subtracted from the resulting indication of average total thickness to yield individual zonal deviations from the average total thickness $e_{TOT.a}$, $e_{TOT.b}$, and $e_{TOT.c}$, respectively. The zonal deviations for bottom profile $e_{BOT.a}$, $e_{BOT.b}$, and $e_{BOT.c}$ are compared with the corresponding zonal deviations for total profile $e_{TOT.a}$, $e_{TOT.b}$, and $e_{TOT.c}$ in a difference computer 55 to give the top profile zonal deviations $e_{TOP.a}$, $e_{TOP.b}$, and $e_{TOP.c}$.

The top profile zonal deviations are read into a top cross direction controller 120, which outputs the necessary screwdown corrections $T_{SD_1}$ and $T_{SD_2}$ and the cross axis correction $T_X$ to upper calender roll 1, upon the closing of switch 129 by programmer 100.

While the machine direction and cross direction control of the top layer have been described as being made in response to differences between total deviations and bottom deviations, it should be made apparent that top thickness control could alternatively be made in response to a comparison of an indication of the combined thickness of the top layer and the layer of tire cord (total thickness minus bottom thickness) with a target representing the desired combined thicknesses of the top layer and layer of tire cord, and that top profile control could be made in response to a comparison of zonal thickness averages of the combined top and tire cord layers with an average thickness for these components of the tire material.

While a preferred embodiment of the invention has been shown and described, it will be apparent to one skilled in the art that numerous modifications may be made thereto without departing from the scope and intent of the invention as recited in the appended claims. For example the bottom and total thickness targets need not remain fixed, but may be altered according to the statistical variance of measured thickness, in the manner disclosed in U.S. Pat. No. 3,515,860, issued June 2, 1970, to C. T. Fitzgerald, Jr. and assigned to the same assignee as the present application. It will further be apparent that the cross direction controllers may be programmed to control the bottom and top cross direction profiles to other than a flat profile.

It is to be understood that a digital computer may perform all or part of the averaging, gauge coordinating, programming, integrating, differencing, profile storing, machine direction controlling, cross direction controlling, curve-fitting, or other processing or storing operations described hereinabove.

The single point gauges may be replaced by a scanning reflection gauge at the expense of the more frequent control actions attainable through the use of single point gauges. Alternatively, scanning gauge 13 in applicants' control system may be replaced by a measuring system comprising single point gauges, should a higher frequency of control actions be required. Such a measuring system may assume the form of that disclosed in the aforementioned application entitled "Measuring System" of J. Donoghue.

It should be further understood that applicants' control system may be used, with some modifications, on other than a four-roll calender; for example, it may be used in connection with a tandem three-roll calender. In such a case a second scanning gauge may be substituted for the single point gauges to provide indications of the thickness of the combined bottom and cord layers prior to the point of lamination with the top layer. However, the use of a second scanning gauge may result in a lower frequency of control actions with regard to the combined bottom and cord layers, because of increased transport delay and because of the time required for a scanning action by such a gauge.

We claim:

1. Method for controlling a tire calender to maintain a desired thickness and profile in a strip of sheet material including first and second layers or rubber and an intermediate layer of tire cord, in which said tire calender includes first layer thickness varying means for varying the machine direction thickness of said first layer uniformly across said first layer, strip thickness varying means for varying the machine direction thickness of said strip uniformly across said strip, first layer profile varying means for varying the thickness of the central portion of said first layer with respect to the thickness at the edge portions of said first layer, and strip profile varying means for varying the thickness of the central portion of said strip with respect to the thickness at the edge portion of said strip, said method comprising controlling the machine direction thickness of said first layer of rubber to a selected thickness target by means of said first layer thickness varying means, controlling the total machine direction thickness of said strip to a selected thickness target by means of said strip thickness varying means, controlling the profile of said first layer of rubber to an average indication of thickness for said first layer by means of said first layer profile varying means, and controlling the profile of said strip to an average indication of thickness for said strip by means of said strip profile varying means.

2. Method for controlling a tire calender to maintain a desired thickness and profile in a strip of sheet material including first and second layers of rubber and an intermediate layer of tire cord, said method comprising measuring the thickness of said first layer at a plurality of longitudinal zones across the layer to derive a thickness profile of said first layer of rubber, measuring the total thickness of said strip at a plurality of longitudinal zones across the strip to derive a thickness profile of said strip, determining indications of overall average thickness across said first layer and across said strip from said respective thickness profiles, controlling the thickness of said first layer uniformly across said first layer in response to a deviation of said first layer overall average thickness indication from a selected first layer thickness target, controlling the thickness of said strip uniformly across said strip in response to a deviation of said strip overall average thickness indication from a selected strip thickness target, determining thickness averages, based on said respective thickness profiles, for each of the plurality of longitudinal zones on said first layer and on said strip, said zones of said first layer corresponding substantially to those of said strip, determining the deviations of said first layer zonal thickness averages from said first layer overall thickness average, controlling the profile of said first layer to said first layer overall thickness average in response to said first layer zonal deviations, determining the deviations of said strip zonal thickness averages from said strip overall thickness average, and controlling the profile of said strip to said strip overall thickness average in response to said strip zonal deviations.

3. Method of claim 2 wherein the thickness profile of said first layer is derived by fitting a curve between indications of first layer thickness obtained at discrete positions across the width of said first layer.

4. Method of claim 2 wherein the respective indications of overall average thickness across said first layer and said strip are derived from substantially the same longitudinal region.

5. Apparatus for controlling a tire calender to maintain a desired thickness and profile in a strip of sheet material including first and second layers of rubber and an intermediate layer of tire cord, in which said tire calender includes first layer thickness varying means for varying the machine direction thickness of said first layer uniformly across said first layer, second layer thickness varying means for varying the machine direction thickness of said second layer uniformly across said layer, first layer profile varying means for varying the thickness of the central portion of said first layer with respect to the thickness at the edge portions of said first layer, and second layer profile varying means for varying the thickness of the central portion of said second layer with respect to the thickness at the edge portion of said layer, said apparatus comprising means responsive to measurements of strip thickness and said first layer thickness for providing separate indications of the thickness of said first layer and a second layer thickness control signal to obtain a desired strip thickness, means for providing separate indications of the profile of said first layer and the profile of said second layer, means responsive to said indication of first layer thickness for controlling the thickness of said first layer of rubber to a selected target by means of said first layer uniform thickness varying means, means responsive to said second layer thickness control signal for controlling the thickness of said second layer by means of said second layer uniform thickness varying means to obtain a desired strip thickness, means responsive to said first layer profile indication for controlling the profile of said first layer of rubber to an average indication of thickness for said first layer, by means of said first layer profile varying means, and means responsive to said second laaye layer profile indication for controlling the profile of said second layer to an average indication of thickness for said second layer, by means of said second layer profile means.

6. Apparatus for automatically controlling a tire calender to maintain a desired thickness and cross direction profile in a strip of sheet material comprising first and second layers of rubber and an intermediate layer of tire cord, in which said first layer of rubber is formed between a first pair of coacting calender rolls having adjustable control elements at either end thereof for adjusting the spacing between said first pair of rolls to vary the thickness of said first layer of rubber, and an additional adjustable profile control element for adjusting the spacing between the ends of said first pair of rolls relative to the spacing at their centers to vary the cross direction profile of said first layer of rubber, and in which said second layer of rubber is formed between a second pair of coacting calender rolls having adjustable control elements at either end thereof for adjusting the spacing between said second pair of rolls to varying the thickness of said second layer of rubber, and an additional adjustable profile control element for adjusting the spacing between the ends of said second pair of rolls relative to the spacing at their centers to vary the cross direction profile of said second layer of rubber, said layer of tire cord being laminated between said first and second layers of rubber by adjoining calender rolls, said apparatus comprising first measuring means located adjacent the input side of one of said adjoining calender rolls for providing separate indications of the thickness of said first layer of rubber at three cross direction positions thereof, each position lying with a different one of three longitudinal bottom layer zones.

first averaging means associated with said first measuring means to determine averages of each of said separate thickness indications and to determine in addition an overall average of the thickness of said first layer, second measuring means located at the strip output side of said adjoining calender rolls and traversing substantially the entire width of said strip to provide a plurality of separate indications of the total thickness of said strip, each indication corresponding to a different transverse position on said strip, second averaging means associated with said second measuring means to determine averages of said separate indications of total thickness and to determine in addition an overall average of the total thickness of said strip, means for subtracting said overall average of thickness of said first layer from a selected first layer thickness target to provide a first layer thickness deviation, a first layer thickness controller for actuating each of said adjustable control elements on said first pair of rolls equally in response to said first layer thickness deviation, means for subtracting said overall total thickness average from a selected total thickness target to provide a resultant total thickness deviation, means for subtracting said first layer thickness deviation from said total thickness deviation to provide a second layer thickness deviation, a second layer thickness controller for actuating each of said adjustable control elements on said second pair of rolls equally in response to said second layer thickness deviation, computer means for fitting a regression curve between said average indications of first layer thickness, said curve including as points thereon each of said average indications and representing an approximation of a cross direction profile of said first layer with respect to thickness, means for integrating said regression curve between predetermined limits representing substantially the edges of said three zones to determine the average thickness of said first layer across each of said zones, means for averaging substantially all of said separate total thickness average indications lying within each one of three longitudinal zones on said strip, said strip zones being coextensive with said first layer longitudinal zones, to determine the average total thickness across each of said strip zones, means for subtracting each of the zonal averages of thickness of said first layer from said overall average of first layer thickness to determine deviations from a flat profile for each zone of said first layer, and for subtracting each of the zonal averages of total thickness from said overall average of total thickness to determine deviations from a flat profile for each zone of said total strip, a first layer profile controller for actuating said control elements and said additional adjustable profile control element on said first pair of rolls in response to said first layer zonal deviations, to bring the cross direction profile of said first layer to a substantially flat condition, and a second layer profile controller for actuating said control elements and said additional adjustable profile control element on said second pair of rolls in response to any one of said total thickness zonal deviations being different from one of said first layer zonal deviations corresponding to the same zone, to bring the cross direction profile of said second layer to a substantially flat condition.

7. A system for controlling machine and cross direction thickness variations of first and second layers of material respectively laminated onto first and second sides of a moving substrate sheet by first and second coating application stations, each of said stations including first means for controlling the machine direction thickness of the coating it applies to the substrate sheet and second means for controlling the cross direction thickness profile of the coating it applies to the substrate sheet, comprising scanning gauge means downstream of the stations for measuring the total thickness of the substrate sheet and the two layers, means upstream of the first station for measuring the thickness of the first coating prior to the first coating being applied to the substrate sheet, said upstream measuring means including coating thickness gauge means fixedly maintained during each scan for monitoring plural different cross sheet zones of the coating thickness, means responsive to the upstream measuring means exclusively of the scanning gauge means for deriving a control signal for the first means of the first station, means responsive to the upstream and scanning gauge measuring means for deriving a control signal for the first means of the second station, means responsive to the upstream measuring means for the different zones exclusively of the scanning gauge means for deriving a control signal for the second means of the first station, means responsive to the scanning gauge means for deriving indications of the total sheet thickness in each of the cross sheet zones, and means for combining signals for the different corresponding zones as derived from the scanning gauge means and the fixedly maintained gauge means to derive a control signal for the second means of the second station.

8. A method of controlling machine and cross direction thickness variations of first and second layers of material respectively laminated onto first and second sides of a moving substrate sheet by first and second coating application stations, each of said stations including first means for controlling the machine direction thickness of the coating it applies to the substrate sheet and second means for controlling the cross direction thickness profile of the coating it applies to the substrate sheet, comprising measuring the total thickness of the substrate sheet and the two layers by scanning a scanning gauge means for the total thickness in a direction between the sheet edges, said scanning gauge means being located downstream of the stations, measuring the thickness of the first coating prior to the first coating being applied to the substrate sheet with another thickness gauge means located upstream of the first station, fixedly maintaining said another thickness gauge means during each scan, monitoring the first coating thickness at plural different cross sheet zones with the another thickness gauge means, controlling the first means of the first station in response to the another thickness gauge means exclusively of the scanning gauge means, controlling the first means of the second station in response to a combination of the measurements from the upstream and scanning gauge measuring means, controlling the second means of the first station in response to the upstream measuring means for the different zones exclusively of the scanning gauge means, responding to the scanning gauge means to derive indications of the total sheet thickness in each of the cross sheet zones, and controlling the second means of the second station in response to a combination of signals for the different corresponding zones as derived from the scanning gauge means and the fixedly maintained gauge means.

9. In a system for controlling thickness variations of first and second layers of material respectively laminated onto first and second sides of a moving substrate sheet by first and second coating application stations, each of said stations including means for controlling the thickness of the coating it applies to the substrate sheet, said system comprising: scanning gauge means downstream of the stations for measuring the total thickness of the substrate, means for scanning the scanning gauge means in a direction between the sheet edges, said scanning gauge means being scanned several times, means for accumulating the signal derived from several scans of the scanning gauge means, means upstream of the first station for measuring the thickness of the first coating prior to the first coating being applied to the substrate sheet, said upstream measuring means including coating thickness gauge means fixedly maintained during each scan for monitoring plural different cross sheet zones of the coating thickness, means responsive to the upstream measuring means for deriving a control signal for the control means of the first station, and means responsive to the upstream measuring means and the accumulated signal for deriving a control signal for the control means of the second station.

10 A system in accordance with claim 9 wherein the system is for controlling machine direction thickness variations of the first and second layers and each of said stations includes means for controlling the machine direction thickness of the coating it applies to the sheet, said means for accumulating including means for deriving a first signal indicative of the total thickness machine direction variations over the several scans, said means for deriving the control signal for the first station including means for additively combining the signals from the different zones as derived from the fixedly maintained gauge means to derive a signal indicative of the first layer machine direction variations, whereby the control signal for the first station is for the machine direction of the first layer, and said means for deriving the control signal for the second station includes means for combining signals that are functions of the first layer and total thickness machine direction variations.

11. A system in accordance with claim 9 wherein the system is for controlling cross direction thickness variations of the first and second layers and each of said stations includes means for controlling the cross direction thickness of the coating it applies to the sheet, means responsive to the upstream measuring means for the different zones for deriving a control signal for the control means of the first station, means responsive to the scanning gauge for deriving indications of the total sheet thickness in each of the cross sheet zones in response to an accumulation of total sheet thickness measurements in the zones as derived from the several scans, and means for combining signals for the different corresponding zones as derived from the several scans of the scanning gauge means and the fixedly maintained gauge means to derive a control signal for the control means of the second station.

12. In a system for controlling machine and cross direction thickness variations of first and second layers of material respectively laminated into first and second sides of a moving substrate sheet by first and second coating aplication stations, each of said stations including first means for controlling the machine direction thickness of the coating it applies to the substrate sheet and second means for controlling the cross direction thickness profile of the coating it applies to the substrate sheet, said system comprising: scanning gauge means downstream of the stations for measuring the total thickness of the substrate sheet and the two layers, means for scanning the scanning gauge means in a direction between the sheet edges, said scanning means being scanned several times, means for accumulating the signal derived from several scans of the scanning gauge means, means upstream of one of the stations for measuring the thickness of the first coating prior to the first coating being applied to the substrate sheet, said upstream measuring means including means fixedly maintained during each scan for monitoring plural different cross sheet zones of the coating thickness, means responsive to the upstream measuring means for deriving a control signal for the first means of the first station, means responsive to the accumulating means for deriving a signal indicative of machine direction variations for the several scans over all of the zones, means responsive to the upstream measuring means and the signal indicative of the machine direction variations over all of the zones for deriving a control signal for the first means of the second station, means responsive to the upstream measuring means for the different zones for deriving a control signal for the second means of the first station, means responsive to the scanning gauge for deriving indications of the total sheet thickness in each of the cross sheet zones in response to an accumulation of total sheet thickness measurements in the zones as derived from the several scans, and means for combining signals for the different corresponding zones as derived from the several scans of the scanning gauge means and the fixedly maintained gauge means to derive a control signal for the second means of the second station.

13. A method of controlling machine and cross direction thickness variations of first and second layers of material respectively laminated onto first and second sides of a moving substrate sheet by first and second coating application stations, each of said stations including first means for controlling the machine direction thickness of the coating it applies to the substrate sheet and second means for controlling the cross direction thickness profile of the coating it applies to the substrate sheet, comprising measuring the total thickness of the substrate sheet and the two layers by scanning a scanning gauge means for the total thickness a plurality of times between the sheet edges, said scanning gauge means being located downstream of the stations, measuring the thickness of the first coating prior to the first coating being applied to the substrate sheet with another thickness gauge located upstream of the first station, fixedly maintaining said another thickness gauge means during each scan, monitoring the first coating thickness at plural different cross sheet zones with the another gauge means, controlling the first means of the first station in response to measurements from the another gauge, accumulating signals from the several scans over all of the zones to derive a machine direction indication of total thickness, controlling the first means of the second station in response to a combination of the measurements from the upstream measuring means and the machine direction indication resulting from the accumulation of the signals over all the zones, responding to the upstream measuring means and the machine direction indication to derive a control signal for the first means of the second station, controlling the second means of the first station in response to the upstream measuring means for the different zones, separately accumulating responses of the scanning gauge in each of the zones over the several scans to derive indications of the total sheet thickness in each of the cross sheet zones, and controlling the second means of the second station in response to a combination of signals for the different corresponding zones as derived from the separately accumulated responses.

14. A method of controlling thickness variations of first and second layers of material respectively laminated onto first and second sides of a moving substrate sheet by first and second coating application stations, each of said stations including means for controlling the thickness of the coating it applies to the substrate sheet, comprising measuring the total thickness of the substrate sheet and the two layers by scanning a scanning gauge means for the total thickness a plurality of times between the sheet edges, said scanning gauge means being located downstream of the stations, measuring the thickness of the first coating prior to the first coating being applied to the substrate sheet with another thickness gauge located upstream of the first station, fixedly maintaining said another thickness gauge means during each scan, controlling the thickness applied by the first station in response to the upstream measuring means, accumulating the signal from several scans of the scanning gauge means, and controlling the thickness applied by the second station in response to a combination of the accumulated signal and the thickness measurement from the upstream measuring means.

15. The method of claim 14 wherein the method is for controlling machine direction thickness variations of the first and second layers and each of said stations includes means for controlling the machine direction thickness of the coating it applies to the sheet, said accumulating step including deriving a first signal indicative of the total thickness machine direction variations over the several scans, and controlling the machine direction thickness of the first layer as applied by the first station in response to an additive combination of the signals derived from the different zones from the fixedly maintained gauge means, and controlling the machine direction thickness of the second layer as applied by the second station in response to an accumulation of the signals from the scanning gauge over the several scans for all of the different zones and a function of the additive combination of the signals.

16. The method of claim 14 wherein the system is for controlling cross direction thickness variations of the first and second layers and each of said stations includes means for controlling the cross direction thickness of the coating it applies to the sheet, said method further comprising controlling the cross direction variations of the first layer in response to measurements derived from the different zones by the upstream measuring means, separately accumulating responses of the scanning gauge in each of the zones over the several scans to derive indications of the total sheet thickness in each of the cross sheet zones, and controlling the cross direction variations of the second layer by controlling the control means of the second station in response to a combination of signals for the different corresponding zones as derived from the separately accumulated responses and the fixedly maintained gauge means.

17. A method of controlling a tire calender to maintain a desired thickness and profile in a strip of sheet material including first and second layers of rubber and an intermediate layer of tire cord, in which said tire calender includes first layer thickness varying means for varying the machine direction thickness of said first layer uniformly across said first layer, strip thickness varying means for varying the machine direction thickness of said strip uniformly across said strip, first layer profile varying means for varying the thickness of the central portion of said first layer with respect to the thickness at the edge portion of said first layer, and strip profile varying means for varying the thickness of the central portion of said strip with respect to the thickness at the edge portion of said strip, said method comprising:

scanning a total thickness gauge for the strip between the strip edges a plurality of times, said total thickness gauge being located downstream of all of said varying means, responding to total thickness measurements of the thickness gauge to derive: a first indication of the total thickness as averaged over several of said scans, second indications of the total thickness in each of a plurality of longitudinal zones of the strip as averaged over several of the scans, and third indications of the deviations of the second indications from an indication of the total average thickness;

measuring the thickness of said first layer of rubber at the plural zones with thickness measuring gauges that are maintained in a fixed position while the several scans of the scanning gauge occur;

responding to the first layer thickness measurements to derive: a fourth indication of the average thickness of the first layer and fifth indications of the thickness of the first layer in each of the zones;

algebraically combining the first and fourth indications to derive a sixth indication;

controlling the machine direction thickness of said first layer to a selected value by activating said first layer thickness varying means in response to the measurements from the fixed gauges;

controlling the profile of said first layer to a selected value by activating the first layer profile varying means in response to a comparison of the measurements from the fixed gauges measuring the different zones;

controlling the machine direction thickness of said strip to a selected value by activating the strip thickness varying means in response to the sixth indication; and controlling the profile of said strip by activating the strip profile varying means in response to comparisons of the second and fifth indications for corresponding zones.

18. The method of claim 17 wherein the first and fourth indications are derived by averaging the fixed and scanning gauge measurements over the same interval.

19. The method of claim 18 wherein two of said fixed gauges are provided, and moving one of said gauges from one of said zones to another of said zones between the several scans.

20. Apparatus for controlling a tire calender to maintain a desired thickness and profile in a strip of sheet material including first and second layers of rubber and an intermediate layer of tire cord, in which said tire calender includes first layer thickness varying means for varying the machine direction thickness of said first layer uniformly across said first layer, strip thickness varying means for varying the machine direction thickness of said strip uniformly across said strip, first layer profile varying means for varying the thickness of one cross direction portion of said first layer with respect to the thickness at another cross sheet portion of said first layer, and strip profile varying means for varying the thickness of one cross direction portion of said strip with respect to the thickness at another cross direction portion of said strip, said apparatus comprising:

a total thickness gauge for the strip, means for scanning the total thickness gauge between the strip edges a plurality of times, said total thickness gauge being located downstream of all of said varying means;

means responsive to total thickness measurements of the thickness gauge to derive: a first indication of the total thickness as averaged over several of said scans, second indications of the total thickness in each of a plurality of longitudinal zones on the strip as averaged over several of the scans, and third indications of the deviations of the second indications from an indication of the total average thickness;

means for measuring the thickness of said first layer of rubber at the plural zones, said first layer measuring means including further gauges that are maintained in a fixed position while the several scans of the scanning gauge occur;

means responsive to the first layer thickness measurements of the first layer measuring means for deriving: a fourth indication of the average thickness of the first layer and fifth indications of the thickness of the first layer in each of the zones;

means for algebraically combining the first and fourth indications to derive a sixth indication;

means responsive to the measurements from the fixed position gauges for deriving a control signal for said first layer thickness varying means so that the machine direction thickness of said first layer is controlled to a selected value;

means for comparing the measurements from the fixed gauges measuring the different zones for deriving a control signal for the first layer profile varying means whereby the profile of said first layer is controlled to a selected value;

means responsive to the sixth indication for deriving a control signal for the strip thickness varying means whereby the machine direction thickness of said strip is controlled to a selected value; and means for comparing the second and fifth indications for corresponding zones for deriving a control signal for the strip profile varying means to control the profile of said strip.

21. A system for deriving data indicative of a property of a moving sheet comprising scanning gauge means for measuring the property, said scanning gauge means being scanned in a direction between the sheet edges a plurality of times, further measuring means for the property, said further measuring means including gauge means fixedly maintained during each scan, means for accumulating a response of the scanning gauge means from several of the scans, and means responsive to the accumulated response and a response from the further measuring means for combining signals that are functions of said responses.

22. The system of claim 21 wherein the fixed gauge means monitors the property in each of a plurality of longitudinally extending zones at different locations across the sheet, said means for accumulating including means for separately accumulating the scanning gauge response from the plural scans for each of the zones, and said means for combining includes means for separately combining the accumulated responses from the different zones with the monitored property derived from the fixed gauge means in the corresponding zones.

23. The system of claim 22 further including means for accumulating the response derived from the fixed gauge means over the same interval as the accumulated response of the scanning gauge means.

24. The system of claim 23 further including means for comparing the separately accumulated responses from the different zones to derive a signal indicative of cross direction variations of the sheet.

25. The system of claim 22 further including means for comparing the separately accumulated responses from the different zones to derive a signal indicative of cross direction variations of the sheet.

26. The system of claim 22 further including means for deriving a curve fit of the property between the plurality of zones, means for averaging the derived curve fit in each of the zones, and means for coupling the averaged curve fit in each of the zones as one input to the means for separately combining.

27. The system of claim 21 further including means for accumulating the response derived from the fixed gauge means over the same interval as the accumulated response of the scanning gauge means.

28. The system of claim 21 wherein the fixed gauge means monitors the property in each of a plurality of longitudinally extending zones at different locations across the sheet, each of said zones having a cross direction extent less than the scanned cross direction extent, said means for accumulating including means for accumulating the scanning gauge response from the plural scans for each of the zones to derive a first machine direction indicating signal, and said means for combining includes means for additively combining signals indicative of the monitored property as derived from the fixed gauge means in the different zones to derive a second machine direction indicating signal, and for combining the first and second machine direction indicating signals to derive a further signal indicative of a machine direction property of the sheet.

29. A method of controlling a property of a moving sheet with scanning and further gauge means for measuring the property, scanning said scanning gauge means in a direction between the sheet edges a plurality of times, fixedly maintaining the further gauge means during each scan, accumulating a response of the scanning gauge means from several of the scans, combining signals that are functions of the accumulated response and a response from the further measuring means, and controlling a property of the sheet in response to the combined signals.

30. The method of claim 29 wherein the fixed gauge means monitors the property in each of a plurality of longitudinally extending zones at different locations across the sheet, said accumulating step including separately accumulating the scanning gauge response from the plural scans for each of the zones, and said combining step includes separately combining the accumulated responses from the different zones with the monitored property indication derived from the fixed gauge means in the corresponding zones.

31. The method of claim 30 further including accumulating the response derived from the fixed gauge means over the same interval as the accumulated response of the scanning gauge means.

32. The method of claim 31 further including comparing the separately accumulated responses from the different zones, and controlling cross direction variations of the sheet in response to the comparison.

33. The method of claim 29 further including comparing the separately accumulated responses from the different zones, and controlling cross direction variations of the sheet in response to the comparison.

34. The method of claim 29 further including accumulating the response derived from the fixed gauge means over the same interval as the accumulated response of the scanning gauge means.

35. The method of claim 29 wherein the fixed gauge means monitors the property in each of plurality of longitudinally extending zones at different locations across the sheet, each of said zones having a cross direction extent less than the scanned cross direction extent, said accumulating step including accumulating the scanning gauge response from the plural scans for each of the zones to derive a first machine direction indicating signal, and said combining step includes additively combining signals indicative of the monitored property as derived from the fixed gauge means in the different zones to derive a second machine direction indicating signal, and controlling a machine direction property of the sheet in response to a combination of the first and second machine direction indicating signals.

36. In a system for controlling the application of a coating applied by a coating station to a moving substrate sheet, scanning gauge means for measuring the thickness of the sheet, said scanning gauge means being scanned in a direction between the sheet edges a plurality of times, further measuring means for monitoring the thickness of the coating prior to application of the coating to the sheet, said further measuring means including gauge means fixedly maintained during each scan, means for accumulating a response of the scanning gauge means from several of the scans, and means responsive to the accumulated response and a response from the further measuring means for combining signals that are functions of said responses to derive a thickness control signal for the coating station.

37. A method of controlling the application of a coating applied by a coating station to a moving substrate sheet in response to thickness measurements of scanning gauge means for measuring the thickness of the sheet and further measuring means for monitoring the thickness of the coating prior to application of the coating to the sheet, said method comprising scanning said scanning gauge means in a direction between the sheet edges a plurality of times, fixedly maintaining said further measuring means during each scan, accumulating a response of the scanning gauge means from several of the scans, and controlling the thickness of the coating in response to functions of the accumulated response and a response from the further measuring means.

* * * * *